(12) United States Patent
Watanabe et al.

(10) Patent No.: US 8,054,581 B2
(45) Date of Patent: Nov. 8, 2011

(54) PERPENDICULAR MAGNETIC RECORDING HEAD

(75) Inventors: Toshinori Watanabe, Tokyo (JP); Toru Takahashi, Tokyo (JP)

(73) Assignee: TDK Corporation, Tokyo (JP)

( * ) Notice: Subject to any disclaimer, the term of this patent is extended or adjusted under 35 U.S.C. 154(b) by 838 days.

(21) Appl. No.: 12/126,274

(22) Filed: May 23, 2008

(65) Prior Publication Data
US 2008/0304186 A1   Dec. 11, 2008

(30) Foreign Application Priority Data
Jun. 8, 2007   (JP) .................. 2007-153267

(51) Int. Cl.
  *G11B 5/127* (2006.01)
(52) U.S. Cl. .................................................. 360/125.3
(58) Field of Classification Search ............... 360/125.3, 360/125.03, 317, 125.09, 125.04, 123.1, 360/125.17, 125.12, 125.16, 125.06, 125.15, 360/122, 125.26, 125.19
See application file for complete search history.

(56) References Cited

U.S. PATENT DOCUMENTS

| 7,920,359 B2 * | 4/2011 | Maruyama et al. ......... 360/125.3 |
| 2003/0174834 A1 * | 9/2003 | Kida ........................ 379/428.01 |
| 2005/0264931 A1 * | 12/2005 | McFadyen .................... 360/126 |
| 2007/0274003 A1 * | 11/2007 | Ota et al. ...................... 360/126 |

FOREIGN PATENT DOCUMENTS

JP   A-2005-092929   4/2005

\* cited by examiner

*Primary Examiner* — Allen Cao
(74) *Attorney, Agent, or Firm* — Oliff & Berridge, PLC (57) ABSTRACT

To provide a perpendicular magnetic recording head which can prevent unintentional recording and erasing from occurring on recording media.
In a perpendicular magnetic recording head comprising a pair of side shield layers made of a soft magnetic material on both sides in a track width direction of a magnetic pole part of a main magnetic pole layer, the pair of side shield layers have a front end face exposed at a medium-opposing surface and a side end face extending from one end part of the front end face remote from the magnetic pole part in the track width direction to the deeper side in a height direction, while the front end face and the side end face form an angle of 90° or greater therebetween.

5 Claims, 9 Drawing Sheets

PERPENDICULAR MAGNETIC RECORDING HEAD

BACKGROUND OF THE INVENTION

1. Field of the Invention

The present invention relates to a perpendicular magnetic recording head which performs a recording action by applying a recording magnetic field perpendicularly to a recording medium plane.

2. Related Background Art

As is well-known, a perpendicular magnetic recording head includes a main magnetic pole layer and a return yoke layer which have front end faces exposed at a surface opposing a recording medium (medium-opposing surface) and are magnetically coupled to each other on the deeper side in the height direction of the medium-opposing surface, a magnetic gap layer interposed between the main magnetic pole layer and return yoke layer on the medium-opposing surface, and a coil layer inducing a recording magnetic field between the main magnetic pole layer and return yoke layer upon energization. The recording magnetic field induced between the main magnetic pole layer and return yoke layer perpendicularly enters a hard film of the recording medium from the front end face of the main magnetic pole layer and returns to the front end face of the yoke layer through a soft film of the recording medium. This performs magnetic recording at a part opposing the front end face of the main magnetic pole layer. The size in the track width direction of the front end face of the main magnetic pole layer, i.e., recording track width size, has been becoming narrower as hard disk drives have been attaining higher recording densities.

In a perpendicular magnetic recording head having a narrowed track, how to suppress side fringing at the time of skewing has become a problem. It has conventionally been well-known, as described in Japanese Patent Application Laid-Open No. 2005-92929, for example, to provide a pair of side shield layers on both sides in the track width direction of the magnetic pole part of the main magnetic pole layer, so that lateral magnetic fluxes leaking from both side faces in the track width direction of the magnetic pole part are absorbed by the pair of side shield layers without reaching the recording medium, thus suppressing side fringing. It has conventionally been typical for the pair of side shield layers to be formed rectangular by photolithography.

SUMMARY OF THE INVENTION

Figure 9:
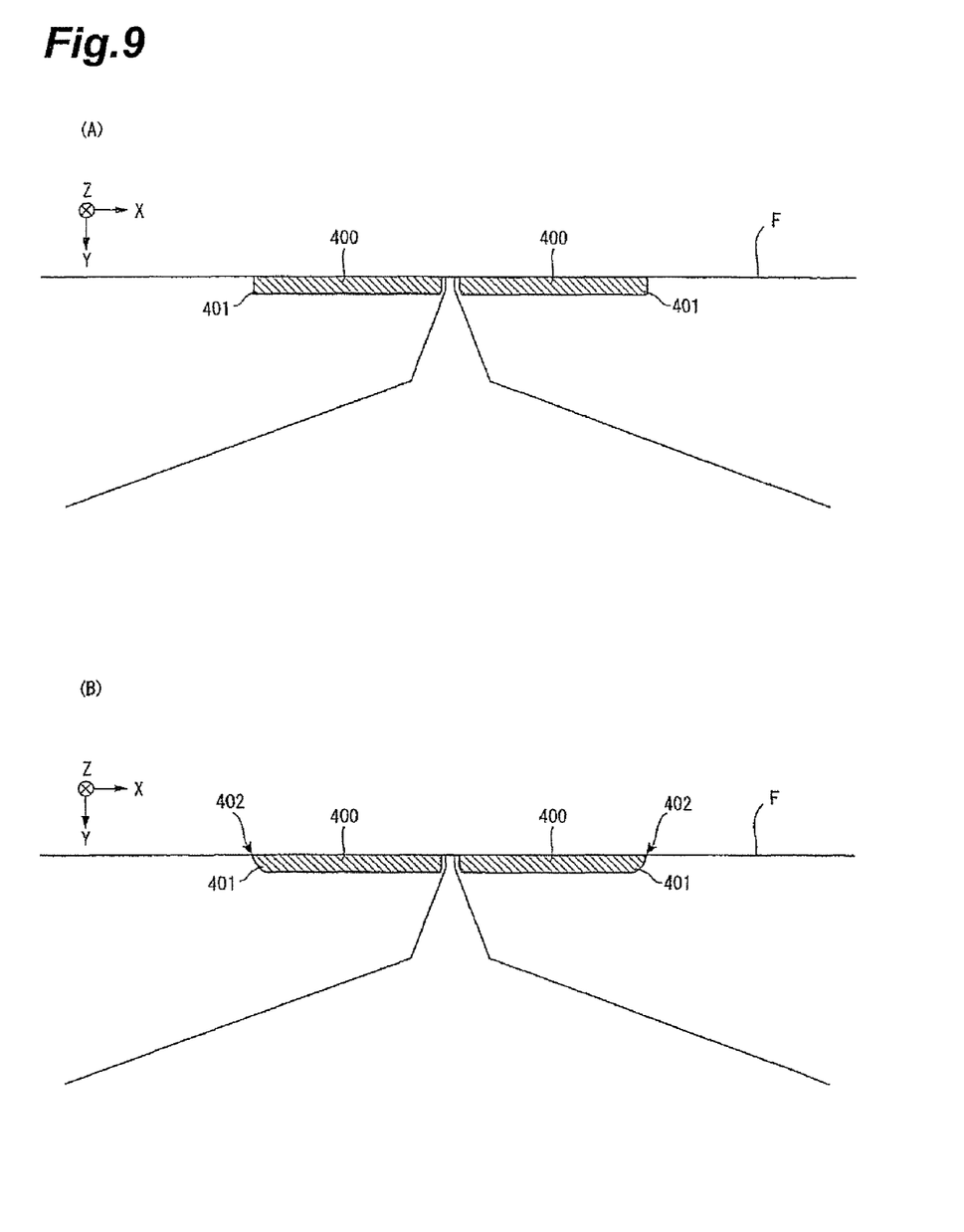

However, it has been found that, when rectangular side shield layers 400 are to be formed as shown in (A) of FIG. 9, smaller areas are less likely to be exposed to light because of the optical proximity effect at the time of exposing a resist to light, so that corners 401 are rounded, whereby acute corners 402 are exposed at the medium-opposing surface F as shown in (B) of FIG. 9. When an acute corner made of a magnetic material is exposed at the medium-opposing surface, external magnetic fields and recording magnetic fields returning from the recording medium are likely to concentrate at the acute corner so as to generate leakage magnetic fluxes from the corner, thereby causing unintentional recording and erasing on the recording medium.

In view of the problem mentioned above, it is an object of the present invention to provide a perpendicular magnetic recording head which can prevent unintentional recording and erasing from occurring on recording media.

Recognizing that the existence of acute corners made of a magnetic material on the medium-opposing surface causes magnetic fields to concentrate, the present invention is achieved by focusing attention on preventing acute corners of a pair of side shield layers generated when exposing a resist to light from being exposed at the medium-opposing surface, i.e., forming an angle of 90° or greater at corners of the pair of side shield layers exposed at the medium-opposing surface.

Namely, the present invention provides a perpendicular magnetic recording head comprising a pair of side shield layers made of a soft magnetic material on both sides in a track width direction of a magnetic pole part of a main magnetic pole layer; wherein the pair of side shield layers have a front end face exposed at a medium-opposing surface and a side end face extending from one end part of the front end face remote from the magnetic pole part in the track width direction to the deeper side in a height direction, the front end face and the side end face forming an angle of 90° or greater therebetween. When the corner formed between the front end face and side end face yields an angle of 90° or greater, the concentration of magnetic fields at the corner is alleviated.

In a first mode, the pair of side shield layers may be formed by a linear area extending in parallel with the medium-opposing surface and constituting the front end face, and a bent area bent from the medium-opposing surface to the deeper side in the height direction so as to form the side end face making an angle greater than 90° with the front end face. Preferably, the bent area has a size greater than that of the linear area in the height direction.

In a second mode, the side end face extending from the front end face to the deeper side in the height direction in the pair of side shield layers may be formed by a curved part, positioned on the deeper side in the height direction of the front end face, having a predetermined radius of curvature, and a linear part, orthogonal to the front end face, extending from the curved part. It will be practical if the side end face has a size in the height direction greater than the radius of curvature of the curved part.

The present invention provides a perpendicular magnetic recording head in which corners of the pair of side shield layers exposed at the medium-opposing surface have an angle of 90° or greater, so that external magnetic fields do not concentrate at the medium-opposing surface, whereby unintentional recording and erasing can be prevented from occurring on recording media.

The present invention will be more fully understood from the detailed description given here in below and the accompanying drawings which are given by way of illustration only, and thus are not to be considered as limiting the present invention.

BRIEF DESCRIPTION OF THE DRAWINGS

(A) of FIG. 6 is a plan view showing mask pattern used when forming the pair of side layers of FIG. 5 and (B) of FIG. 6 is a plan view showing resist pattern used when forming the pair of side shield layers of FIG. 5.

(A) of FIG. 8 is a plan view showing mask pattern used when forming the pair of side shield layers of FIG. 7 and (B) of FIG. 8 is a plan view showing resist pattern used when forming the pair of side shield layers of FIG. 7; and (A) of FIG. 9 is a plan view showing a designed two-dimensional form (corresponding to a mask pattern) of conventional side shield layers and (B) of FIG. 9 is a plan view showing an actual two-dimensional form (corresponding to a resist pattern) of conventional side shield layers.

DESCRIPTION OF THE PREFERRED EMBODIMENTS

In the following, the present invention will be explained with reference to the drawings. In each drawing, X, Y, and Z directions are defined by the track width direction, the height direction, and the laminating direction (thickness direction) of layers constituting a perpendicular magnetic recording head, respectively.

Figure 1:
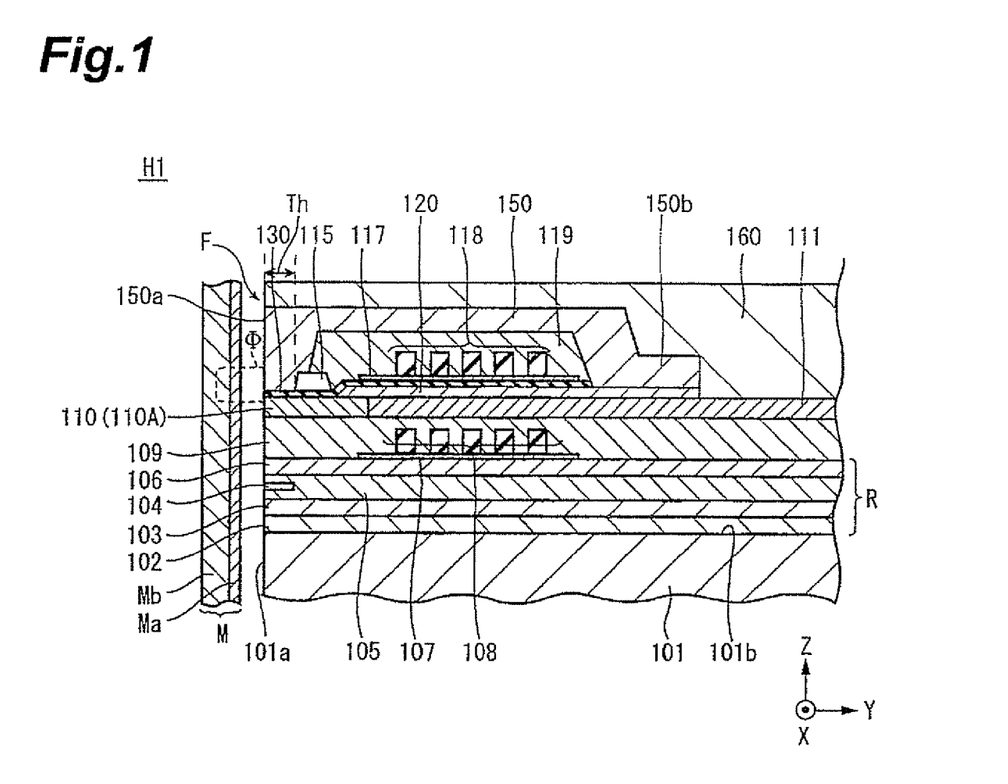
FIG. 1 is a sectional view showing the multilayer structure of the perpendicular magnetic recording head in accordance with the first embodiment of the present invention.
Figure 2:
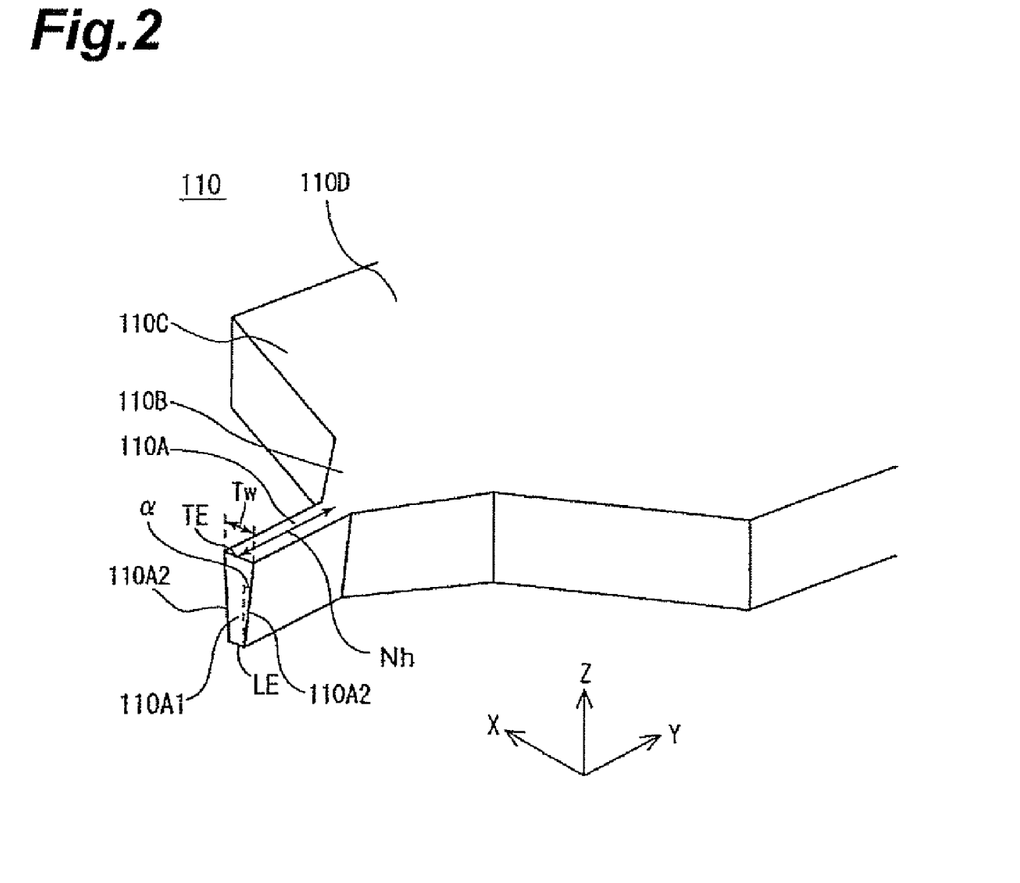
FIG. 2 is a perspective view for explaining the main magnetic pole form.
Figure 3:
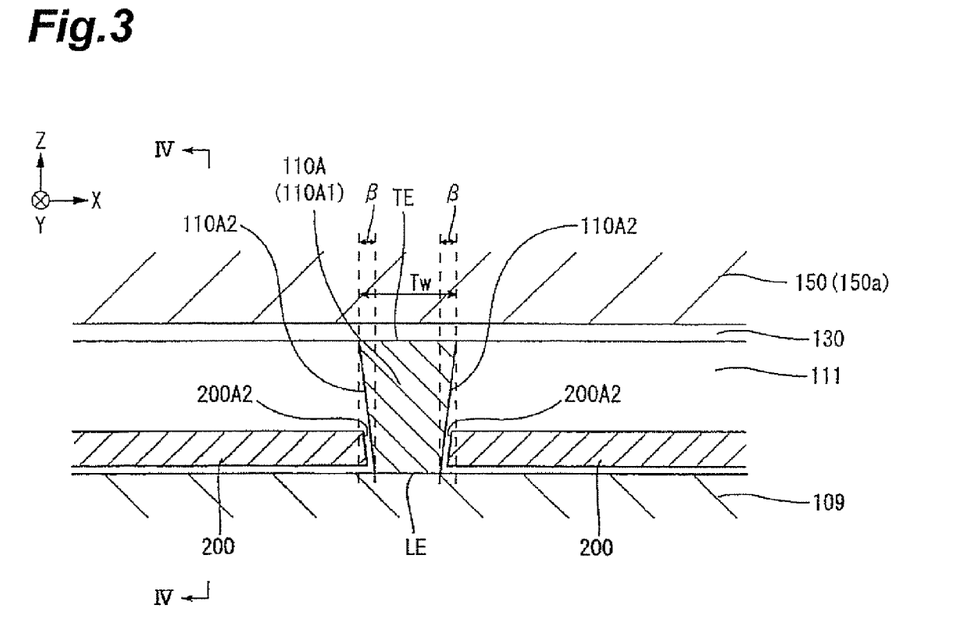
FIG. 3 is a sectional view showing the multilayer structure of the perpendicular magnetic recording head of FIG. 1 as seen from the medium-opposing surface side.
Figure 4:
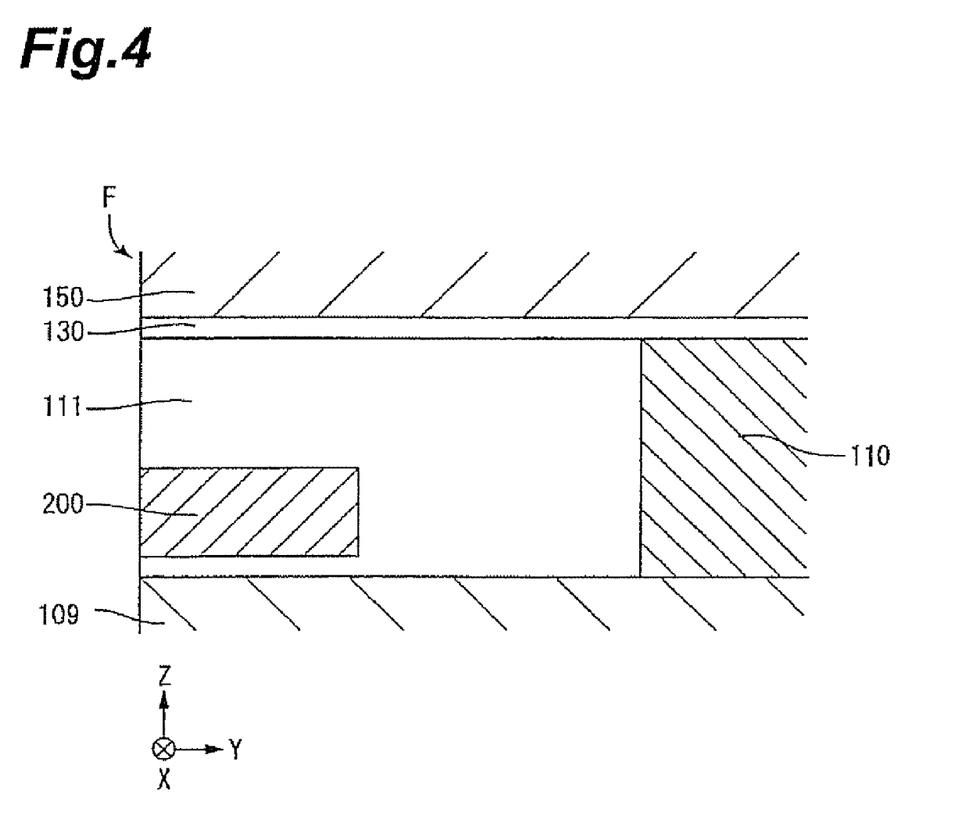
FIG. 4 is a sectional view taken along the line IV-IV of FIG. 3.

FIGS. 1 to 6 show a first embodiment of the present invention. FIG. 1 is a sectional view showing the multilayer structure of a perpendicular magnetic recording head H1. FIG. 2 is a perspective view showing a main magnetic pole form. FIG. 3 is a sectional view showing the multilayer structure of the perpendicular magnetic recording head H1 as seen from the medium-opposing surface side. FIG. 4 is a sectional view taken along the line IV-IV of FIG. 3.

The perpendicular magnetic recording head H1 provides a recording medium M with a recording magnetic field Φ perpendicular thereto, thereby perpendicularly magnetizing a hard film Ma of the recording medium M. The recording medium M has the hard film Ma with a higher remanent magnetization on the medium surface side and a soft film Mb with a higher magnetic permeability on the inner side of the hard film Ma. The recording medium M is shaped like a disk, for example, and is rotated about the center of the disk as a rotary axis. A slider 101 is formed by a nonmagnetic material such as $Al_2O_3$·TiC. The slider 101 has a medium-opposing surface 101a opposing the recording medium M. As the recording medium M rotates, a surface airflow levitates the slider 101 from the surface of the recording medium M.

The trailing-side end face 101b of the slider 101 is formed with a nonmagnetic insulating layer 102 made of an inorganic material such as $Al_2O_3$ or $SiO_2$, while a reading part R is formed on the nonmagnetic insulating layer 102. The reading part R has a lower shield layer 103, an upper shield layer 106, an inorganic insulating layer (gap insulating layer) 105 filling the gap between the lower and upper shield layers 103, 106, and a reading device 104 positioned within the inorganic insulating layer 105. The reading device 104 is a magnetoresistive device such as AMR, GMR, or TMR.

By way of a coil insulating foundation layer 107, a first coil layer 108 constituted by a plurality of lines made of a conductive material is formed on the upper shield layer 106. The first coil layer 108 is made of at least one nonmagnetic metal material selected from Au, Ag, Pt, Cu, Cr, Al, Ti, NiP, Mo, Pd, and Rh, for example. It may have a multilayer structure in which such nonmagnetic metal materials are laminated. A coil insulating layer 109 made of $Al_2O_3$, $SiO_2$, or the like is formed about the first coil layer 108.

The upper face of the coil insulating layer 109 is made flat. An undepicted plating foundation layer is formed as a layer on the upper side of the flat surface, while a main magnetic pole layer 110 made of a ferromagnetic material having a high saturated magnetic flux density such as Ni—Fe, Co—Fe, or Ni—Fe—Co is formed on the plating foundation layer.

As shown in FIG. 2, the main magnetic pole layer 110 has a magnetic pole part (pole straight part) 110A, a $1^{st}$ flare part 110B, a $2^{nd}$ flare part 110C, and a base part 110D successively from the medium-opposing surface F side. The magnetic pole part 110A has a front end face 110A1 exposed at the medium-opposing surface F. Its size in the track width direction at the trailing edge TE is defined by a recording track width Tw, while its size in the height direction is defined by a predetermined neck height Nh. The magnetic pole part 110A uniformly yields a trapezoidal (bevel) form which is narrower on the leading edge side LE than on the trailing edge side TE throughout its length when seen from the medium-opposing surface F. Beveling the magnetic pole part 110A can reduce leakage magnetic fields reaching adjacent tracks on the recording medium M from the leading edge LE side, thereby yielding the side fringing suppressing effect. At present, the recording track width Tw is about 100 to 150 nm, the neck height Nh is about 100 to 150 nm, the thickness is about 200 to 300 nm, and the bevel angle a is about 7 to 9°. The $1^{st}$ flare part 110B is an area for narrowing the recording magnetic field from the base part 110D to the magnetic pole part 110A and expands the size in the track width direction from the magnetic pole part 110A to the deeper side in the height direction. The $2^{nd}$ flare part 110C is an area for adjusting a domain structure generated in the base part 110D after excitation such that it is oriented in the track width direction, and joins the $1^{st}$ flare part 110B and the base part 110D to each other. The main magnetic pole layer 110 of this embodiment is not formed on the whole coil insulating layer 109 but locally on only the medium-opposing surface F side thereof, and is magnetically connected to an auxiliary yoke layer 120 at the base part 110D. The auxiliary yoke layer 120 is made of a magnetic material having a saturated magnetic flux density lower than that of the main magnetic pole layer 110 and transmits the recording magnetic flux induced by the recording coil (first and second coil layers 108, 118) to the main magnetic pole layer 110. A nonmagnetic material layer 111 is formed about the main magnetic pole layer 110, and is made flat such that the upper face of the main magnetic pole layer 110 and the upper face of the nonmagnetic material layer 111 are flush with each other.

As shown in FIG. 3, a pair of side shield layers 200 are formed on both sides in the track width direction of the magnetic pole part 110A of the main magnetic pole layer 110 so as to be located more on the leading edge LE side. The side shield layers 200 are formed from a soft magnetic material such as NiFe or NiFeCo, for example, by way of the nonmagnetic material layer 111 on the coil insulating layer 109 and exhibit a magnetic shield effect for absorbing lateral magnetic fluxes leaking from both side faces 110A2 in the track width direction of the magnetic pole part 110A of the main magnetic pole layer 110 at the time of recording actions. The pair of side shield layers 200 are elongated in the track width direction and extend in the height direction from the magnetic pole part 110A of the main magnetic pole layer 110 to the $1^{st}$ flare part 110B, while being magnetically separated from each other (without any magnetic connection to the other magnetic material layers) by the nonmagnetic material layer 111 burying their surroundings. On the main magnetic pole layer 110 side, each side shield layer 200 has an end face 210A2 forming a taper surface which corresponds to the trapezoidal form of the opposing magnetic pole part 110A and increases the thickness as it is distanced farther in the track width direction from its corresponding side face 110A2 of the magnetic pole part 110A, so as to be parallel to the side face 110A2. The end face 210A2 is positioned in an overlap area β (FIG. 3) with the magnetic pole part 110A so as to be able to absorb more of lateral magnetic fluxes leaking from the side face 110A2 of the magnetic pole part 110A. The overlap area β is an area from a side-face position in the track width direction at the trailing edge TE of the magnetic pole part 110A to a side-face position in the track width direction at the leading edge RE of the magnetic pole part 110A. The gap by which the end faces 210A2 of the pair of side shield layers 200 oppose their corresponding side faces 110A2 of the magnetic pole part 110A can be set according to the bevel angle α of the magnetic pole part 110A. Each side shield layer 200 has a fixed thickness except for the end face 210A2.

A magnetic gap layer 130 made of an inorganic nonmagnetic insulating material such as $Al_2O_3$ or $SiO_2$, for example, is formed on the main magnetic pole layer 110 and auxiliary yoke layer 120 by a thickness corresponding to a predetermined gap distance. The thickness of the magnetic gap layer 130 is about 50 nm at present. On the magnetic gap layer 130, a height determining layer 115 is formed at a position retracted from the medium-opposing surface F by a predetermined throat height Th to the deeper side in the height direction, while the second coil layer 118 is formed on the deeper side in the height direction of the height determining layer 115 by way of a coil insulating foundation layer 117.

As with the first coil layer 108, the second coil layer 118 is formed by a plurality of lines made of a conductive material. For example, the second coil layer 118 is made of at least one nonmagnetic metal material selected from Au, Ag, Pt, Cu, Cr, Al, Ti, NiP, Mo, Pd, and Rh. It may have a multilayer structure in which such nonmagnetic metal materials are laminated. The first and second coil layers 108, 118 are electrically connected to each other at their end parts in the track width direction (depicted X direction) so as to form a solenoid. The form of coil layers (magnetic field generating means) is not limited to the solenoid in particular, though. A coil insulating layer 119 is formed about the second coil layer 118.

A return yoke layer 150 made of a ferromagnetic material having a high saturated magnetic flux density such as Ni—Fe, Co—Fe, or Ni—Fe—Co is formed such as to extend over the coil insulating layer 119, height determining layer 115, and magnetic gap layer 130. The return yoke layer 150 has a front end face 150a, which is exposed at the medium-opposing surface F and opposes the magnetic pole part 110A of the main magnetic pole layer 110 while interposing the magnetic gap layer 130 therebetween, and a connecting part 150b magnetically connecting with the base part 110D of the main magnetic pole layer 110 through the auxiliary yoke layer 120 on the deeper side in the height direction. The throat height Th of the return yoke layer 150 is defined by the height determining layer 115. The return yoke layer 150 is covered with a protecting layer 160 made of an inorganic nonmagnetic insulating material.

Figure 5:
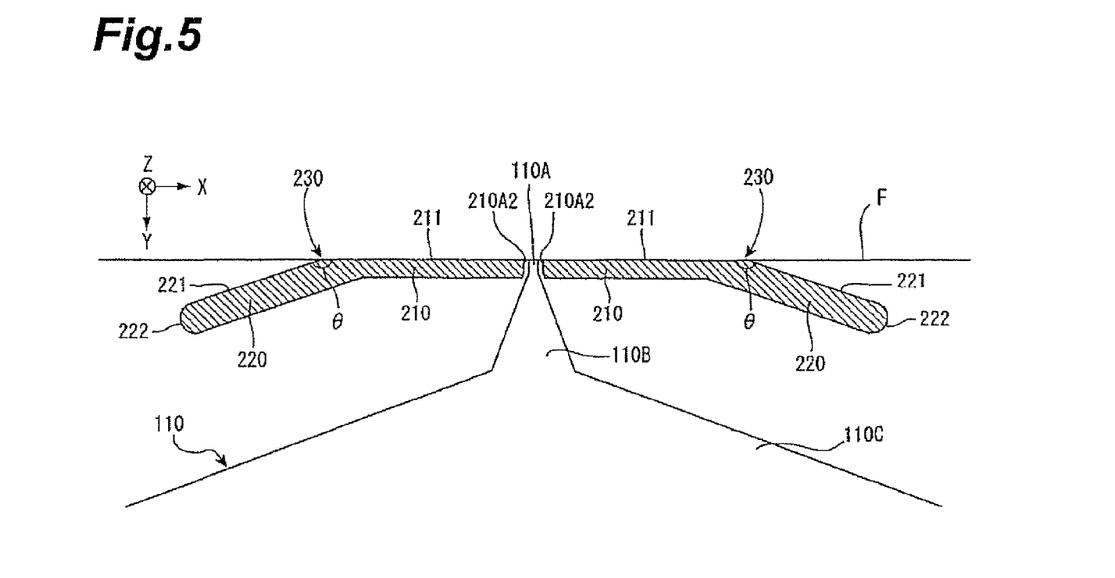
FIG. 5 is a plan view showing a pair of side shield layers.
Figure 6:
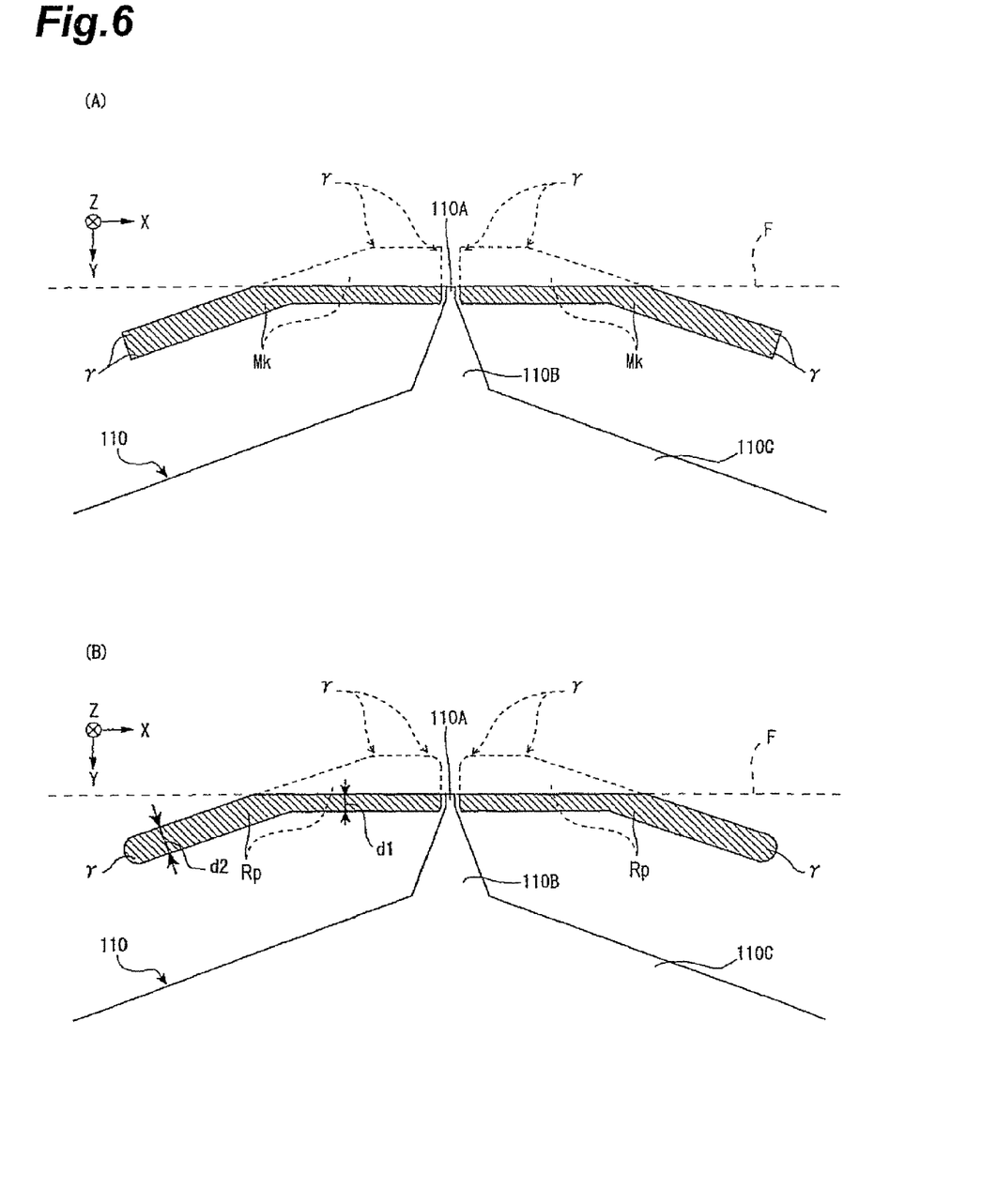

The perpendicular magnetic recording head H1 having the foregoing overall structure is characterized by the two-dimensional form of the pair of side shield layers 200. The pair of side shield layers 200 will now be explained in more detail with reference to FIGS. 5 and 6. FIG. 5 is a plan view showing the pair of side shield layers 200.

The pair of side shield layers 200 are symmetrical to each other with respect to the magnetic pole part 110A of the main magnetic pole layer 110 interposed therebetween. Each side shield layer 200 is formed by a linear area 210 exposed at the medium-opposing surface F and a bent area 220 bent by a predetermined angle (180°−θ) from the medium-opposing surface F to the deeper side in the height direction.

The linear area 210 has a front end face 211 exposed at the medium-opposing surface F and an end face 210A2 opposing the magnetic pole part 110A of the main magnetic pole layer 110 in the track width direction, while continuing to the bent area 220 at an end part (one of both end parts in the track width direction that is remote from the magnetic pole part 110A) on the side opposite from the end face 210A2. The size d1 in the height direction of the linear area 210 is substantially constant.

The bent area 220 has a side end face 221 extending from an end part remote from the magnetic pole part 110A in the track width direction of the front end face 211 of the linear area 210 to the deeper side in the height direction, and a curved part 222 formed by the optical proximity effect at the time of exposing a resist to light during the manufacturing process. The size d2 of the bent area 220 in the height direction is set greater than the size d1 of the linear area 210 in the height direction.

In each side shield layer 200, a corner 230 is formed between the front end face 211 and the side end face 221 but has an obtuse angle (angle θ>90° between the front end face 211 and side end face 221), whereby the perpendicular recording magnetic field Φ returning to the return yoke layer 150 through the recording medium M and external magnetic fields are dispersed over and absorbed by a wide area of the front end face 211 and side end face 221 without being excessively concentrated at the corner 230. This reduces leakage magnetic fluxes directed from the corner 230 to the recording medium in the state where the recording coil is not energized (the energization of the recording coil has ended), whereby the corner 230 can be prevented from causing unintentional recording and erasing. Consequently, recording characteristics suitable for higher recording densities can be obtained.

The pair of side shield layers 200 can be formed by frame plating or sputtering, for example.

In the case of frame plating, a resist is initially applied onto the main magnetic pole layer 110 and nonmagnetic material layer 111. Then, the resist on the main magnetic pole layer 110 and nonmagnetic material layer 111 is exposed to light through a photomask formed with a mask pattern Mk defining a side shield form. Next, the resist is developed, so as to yield a resist pattern (frame) Rp corresponding to the side shield form. Subsequently, a soft magnetic material film is formed by plating in the space defined by the resist pattern Rp. Removing the resist pattern Rp thereafter yields the pair of side shield layers 200 made of the soft magnetic material film.

In the case of sputtering, a soft magnetic material film to become a pair of side shield layers is initially sputtered onto the main magnetic pole layer 110 and nonmagnetic material layer 111. Next, a resist is applied onto the soft magnetic material film. Then, the resist on the soft magnetic material film is exposed to light through a photomask formed with a mask pattern Mk defining a side shield form. Subsequently, the resist is developed, so as to yield a resist pattern Rp corresponding to the side shield form. Thereafter, the soft magnetic material film is etched away from the area not covered with the resist pattern Rp, and then the resist pattern Rp is removed. This yields the pair of side shield layers 200 made of the soft magnetic material film.

In either case, the two-dimensional form of the pair of side shield layers 200 is defined by the resist pattern Rp. (A) of FIG. 6 is a plan view showing the mask pattern Mk and (B) of FIG. 6 is a plan view showing the resist pattern Rp, while the hatched areas correspond to the side shield form.

The mask pattern Mk used at the time of exposing the resist to light is a design pattern (with a designed value) linearly defining a desirable side shield form (boundary between exposure and light-shielding areas) and includes a plurality of corners γ each having an angle of 90° or greater at positions separated in the height direction from a position to become the medium-opposing surface F. In the resist exposure using the mask pattern Mk, smaller areas are less likely to be exposed to light because of the optical proximity effect. Therefore, the resist pattern Rp actually obtained after the exposure has all the corners γ rounded as shown in (B) of FIG. 6. In this embodiment, the side shield layers 200 have the linear areas 210 and bent areas 220, so that the corners to be rounded by the optical proximity effect are shifted to the deeper side in the height direction of the medium-opposing surface F, and the corners 230 exposed at the medium-opposing surface F (corners where the front end faces 211 intersect their corresponding side end faces 221) are made greater than 90°, so as not to generate acute corners on the medium-opposing surface F. Since the medium-opposing surface F is formed by polishing an end face to become the medium-opposing surface, the mask pattern Mk, the resist pattern Rp, and the soft magnetic material film to become the pair of side shield layers 200 are also formed on the side to be removed by polishing (the depicted upper side of the medium-opposing surface F) as indicated by broken lines in (A) and (B) of FIG. 6.

Figure 7:
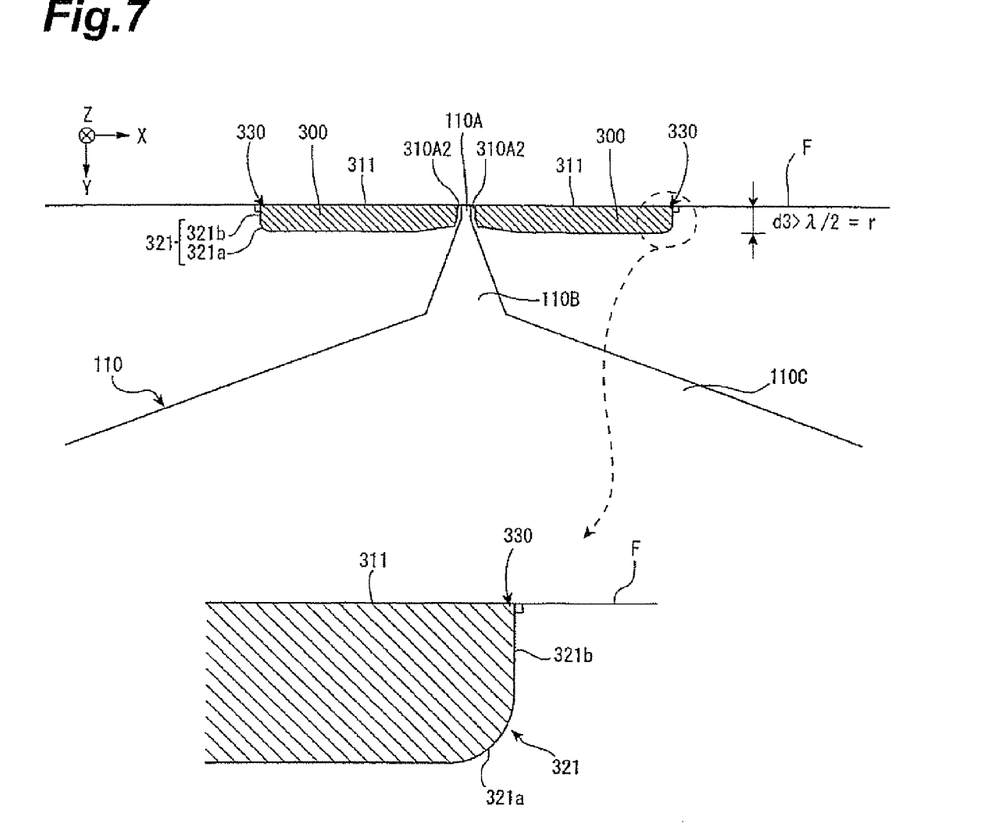
FIG. 7 is a plan view showing a pair of side shield layers having a two-dimensional form different from that of FIG. 5 in the perpendicular magnetic recording head in accordance with the second embodiment of the present invention.
Figure 8:
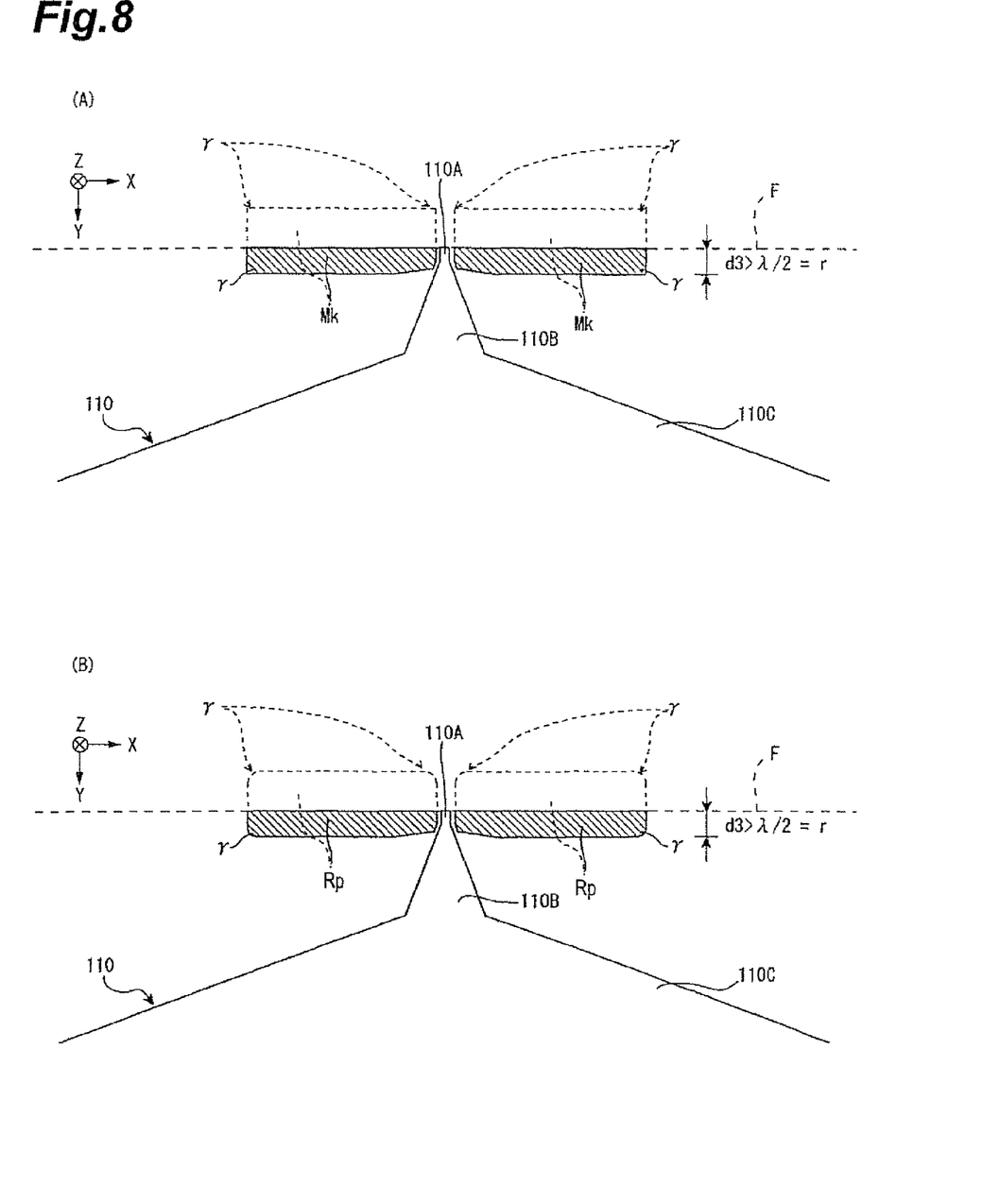

FIGS. 7 and 8 show a second embodiment of the present invention. The perpendicular magnetic recording head H2 in accordance with the second embodiment comprises a pair of side shield layers 300 having a two-dimensional form different from that of the first embodiment. Except for the two-dimensional form of the pair of side shield layers, the second embodiment has the same structure as that of the first embodiment. FIG. 7 is a plan view showing the pair of side shield layers 300. (A) of FIG. 8 is a plan view showing a mask pattern Mk and (B) of FIG. 8 is a plan view showing a resist pattern Rp. In FIG. 8, the hatched areas correspond to the side shield form.

The pair of side shield layers 300 are symmetrical to each other with respect to the magnetic pole part 110A of the main magnetic pole layer 110 interposed therebetween. Each side shield layer 300 exhibits a substantially rectangular form having a front end face 311 exposed at the medium-opposing surface F, an end face 310A2 opposing the magnetic pole part 110A of the magnetic pole layer 110 in the track width direction, and a side end face 321 extending from the end part opposite from the end face 310A2 (one of both end parts in the track width direction that is remote from the magnetic pole part 110A) to the deeper side in the height direction. The side end face 321 comprises a curved part 321a formed at the rear end in the height direction because of the optical proximity effect at the time of exposing a resist to light during the manufacturing process and a linear part 321b, orthogonal to the front end face 311, extending from the curved part 321a to the medium-opposing surface F. Here, letting r be the radius of curvature of the curved part 321a, the size d3 in the height direction of the side end face 321 (from the front end face 311 to the rear end in the height direction of the side shield layer 300) satisfies the conditional expression of d3>r. The radius of curvature r of the curved part 321a is determined by ½ of the wavelength λ of light used when exposing the resist to light for forming a resist pattern which defines the two-dimensional form of the pair of side shield layers 300 (r=λ/2). Namely, when the size d3 in the height direction of the side shield layer 300 at the side end face 321 is greater than λ/2, the linear part 321b is inevitably formed in the side end face 321 of the side shield layer 300, whereby no curved part 321a is exposed at the medium-opposing surface F. Consequently, a corner 330 formed between the front end face 311 and side end face 321 has a right angle (90°), which can alleviate the concentration of magnetic fields at the corner 330. Therefore, as in the first embodiment, leakage magnetic fluxes directed from the corner 330 to the recording medium in the state where the recording coil is not energized (the energization of the recording coil has ended) are reduced, whereby the corner 330 can be prevented from causing unintentional recording and erasing. In the exposure to light having a wavelength of 365 nm, for example, the size d3 in the height direction of the side shield layer 300 at the side end face 321 is required to be set to 182.5 nm or greater.

As shown in (A) of FIG. 8, the mask pattern Mk used at the time of exposing the resist to light is a design pattern (with a designed value) linearly defining a desirable side shield form (boundary between exposure and light-shielding areas) and includes a plurality of corners γ each having an angle of 90° or greater at positions separated in the height direction from a position to become the medium-opposing surface F in the second embodiment as well. In the resist exposure using the mask pattern Mk, smaller areas are less likely to be exposed to light because of the optical proximity effect as mentioned above, whereby the resist pattern Rp actually obtained after the exposure has all the corners γ rounded as shown in (B) of FIG. 8. In this embodiment, the size d3 in the height direction of the side shield layer 300 is made greater than ½ of the wavelength λ of light used for the resist exposure, so that the curved parts 321a formed by the optical proximity effect are shifted to the deeper side in the height direction of the medium-opposing surface F, and the angle of the corners 330 exposed at the medium-opposing surface F (the angle θ between the front end face 311 and linear part 321b) is set to 90°, so as not to generate acute corners on the medium-opposing surface F. Since the medium-opposing surface F is formed by polishing an end face to become the medium-opposing surface, the mask pattern Mk, the resist pattern Rp, and the soft magnetic material film to become the pair of side shield layers 300 are also formed on the side to be removed by polishing (the depicted upper side of the medium-opposing surface F) as indicated by broken lines in (A) and (B) of FIG. 8.

Though the foregoing explains embodiments in which a pair of side shield layers 200, 300 are located more on the leading edge LE side of the magnetic pole part 110A of the main magnetic pole layer 110, the pair of side shield layers may be formed in the whole area of the magnetic pole part 100A from the leading edge LE to the trailing edge TE. The present invention is employable regardless of the thickness of the pair of side shield layers.

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A perpendicular magnetic recording head comprising a pair of side shield layers made of a soft magnetic material located on both sides in a track width direction of a magnetic pole part of a main magnetic pole layer;

wherein the pair of side shield layers have a front end face exposed at a medium-opposing surface and a side end face extending from one end part of the front end face remote from the magnetic pole part in the track width direction to the deeper side in a height direction, the front end face and the side end face forming an angle of 90° or greater therebetween.

2. A perpendicular magnetic recording head according to claim 1, wherein the pair of side shield layers are formed by a linear area extending in parallel with the medium-opposing surface and constituting the front end face, and a bent area bent from the medium-opposing surface to the deeper side in the height direction so as to form the side end face making an angle greater than 90° with the front end face.

3. A perpendicular magnetic recording head according to claim 2, wherein, in the pair of side shield layers, the bent area has a size greater than that of the linear area in the height direction.

4. A perpendicular magnetic recording head according to claim 1, wherein the side end face of the pair of side shield layers comprises a curved part, positioned on the deeper side in the height direction of the front end face, having a predetermined radius of curvature, and a linear part, orthogonal to the front end face, extending from the curved part.

5. A perpendicular magnetic recording head according to claim 4, wherein, in the pair of side shield layers, the side end face has a size in the height direction greater than the radius of curvature of the curved part.

* * * * *